United States Patent
Pharies et al.

(10) Patent No.: US 7,197,512 B2
(45) Date of Patent: Mar. 27, 2007

(54) TYPE BRIDGES

(75) Inventors: Stefan H. Pharies, Seattle, WA (US); Sowmy K. Srinivasan, Redmond, WA (US); Natasha H. Jethanandani, Bellevue, WA (US); Yann Erik Christensen, Seattle, WA (US); Elena A. Kharitidi, Sammamish, WA (US); Douglas M. Purdy, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 10/401,244

(22) Filed: Mar. 26, 2003

(65) Prior Publication Data

US 2004/0193616 A1    Sep. 30, 2004

(51) Int. Cl.
G06F 7/00   (2006.01)
(52) U.S. Cl. .................. 707/103 R; 719/316; 717/146
(58) Field of Classification Search ............... 719/313, 719/310, 316, 330; 710/71; 707/10, 100, 707/103 R–103 Z; 717/120, 146
See application file for complete search history.

(56) References Cited

U.S. PATENT DOCUMENTS

| | | | |
|---|---|---|---|
| 5,724,588 A | 3/1998 | Hill et al. | 709/328 |
| 5,974,416 A | 10/1999 | Anand et al. | 707/10 |
| 6,108,715 A | 8/2000 | Leach et al. | 709/330 |
| 6,167,565 A | 12/2000 | Kanamori | 717/146 |
| 6,249,822 B1 | 6/2001 | Kays, Jr. et al. | 709/330 |
| 6,263,491 B1 | 7/2001 | Hunt | 717/130 |
| 6,298,391 B1 | 10/2001 | Kennedy et al. | 709/328 |
| 6,301,585 B1 | 10/2001 | Milne | 707/103 |
| 6,481,008 B1 * | 11/2002 | Chaiken et al. | 717/158 |
| 6,519,764 B1 | 2/2003 | Atkinson et al. | 717/120 |
| 2003/0046317 A1 | 3/2003 | Cseri et al. | 707/513 |
| 2004/0064825 A1 * | 4/2004 | Lim et al. | 719/319 |

FOREIGN PATENT DOCUMENTS

CA    2329559    6/2002

(Continued)

OTHER PUBLICATIONS

Chiu et al., The Proteus multiprotocol message library, Conference on High Performance Networking and Computing, pp. 1-9, Year of Publication: 2002.*

(Continued)

*Primary Examiner*—Van H. Nguyen
(74) *Attorney, Agent, or Firm*—Workman Nydegger (57) ABSTRACT

Methods, systems, and computer program products for converting an object of one type to an object of another type that allow for the runtime operation of the conversion process to be altered or customized. The conversion may occur within an extensible serialization engine that serializes, deserializes, and transforms objects of various types. The runtime operation of the serialization engine is altered by one or more extension routines that implement the desired customizations or extensions, without requiring replacement of other existing routines. Based on type information, identified for an initial object, the object is converted to an intermediate representation which permits runtime modification, including modification of object names, object types, and object data. The intermediate representation of the initial object is modified in accordance with extension routines that alter the runtime operation of the serialization engine, and the intermediate representation is converted to a final object and type.

33 Claims, 7 Drawing Sheets

FOREIGN PATENT DOCUMENTS

| | | |
|---|---|---|
| EP | 1030253 A1 | 8/2000 |
| JP | 2002-297575 | 10/2002 |

OTHER PUBLICATIONS

Opyrchal et al., Efficient object serialization in Java, Electronic Commerce and Web-based Applications/Middleware, May 31-Jun. 4, 1999 pp. 96-101.*

"*XML Information Set*," W3C , <http://www.w3.org/TR/xml-infoset/>, visited Mar. 26, 2003.

Maeda, Kazuaki; "*Runtime Code Generation for Object Serialization*," Proceedings of the International Conference on Parallel and Distributed Processing Techniques and Applications. PDPTA '2000, Jun. 26-29, 2000, vol. 5, pp. 2531-2536.

Crary, Karl; and Weirich, Stephanie; "*Flexible Type Analysis*," SIGPLAN Notices, Sep. 1999, vol. 34, No. 9, pp. 233-248.

You-Chin Fuh; and Mishra, Prateek; "*Type Inference with Subtypes*," Theoretical Computer Science, Jun. 22, 1990, vol. 73, No. 2, pp. 155-175.

Wile, David S.; "*Type Transformations*," IEEE Transactions on Software Engineering, Jan. 1981, vol. SE-7, No. 1, pp. 32-39.

Cranefield, Stephen; "*Networked Knowledge Representation and Exchange Using UML and RDF*,"JoDI—Journal of Digital Information, 2001, vol. 1, No. 8.

Guerraoui, Rachid; Felber, Pascal; Garbinato, Benoit; and Mazouni, Karim; "*System Support for Object Groups*," Conference Proceedings OOPSLA '98. Conference on Object-Oriented Programming, Systems, Languages and Applciations, Oct. 18-22, 1998, pp. 244-258.

Kruchten, Philippe; Ehrenfried, Dan; Thompson, Kim; and Thompson, Chris; "*Ada Type Interchange Moving Data Between Platforms*," Ada Letters, Jan.-Feb. 1996, vol. 16, No. 1, pp. 46-53.

Abayan, M.; Strong, R.; and Wimmers, E.; "*The RAPID C++ Environment*," Proceedings of the Fourteenth Annual ACM Symposium on Principles of Distributed Computing, Aug. 20-23, 1995, p. 258.

Yu-Hsiu Wei, Stoyenko, Alexander D.; and Goldszmidt, German S.; "*The Design of a Stub Generator for Heterogeneous RPC Systems*," Journal of Parallel and Distributed Computing, Mar. 1991, vol. 11, No. 3, pp. 188-197.

Esposito, Dino, *Binary Serialization of ADO.NET Objects*, MSDN Magazine, Dec. 2002.

Seidmann, Thomas, *Replicated Distributed Shared Memory for the .NET Framework*, 1st Int. Workshop on C#and .NET Technologies on Algorithms, Computer Graphics, Visualization, Computer Vision and Distributed Computing, Feb. 6-8, 2003.

Kono, Kenji, *Efficient RMI; Dynamic Specialization of Object Serialization*, Distributed Computing System, 2000. Proceedings 20th International Conference on Taipei, Taiwan. Apr. 10-13, 2000.

* cited by examiner

TYPE BRIDGES

CROSS-REFERENCE TO RELATED APPLICATIONS

N/A

BACKGROUND OF THE INVENTION

1. The Field of the Invention

The present invention relates to object serialization. More particularly, the present invention relates to methods, systems, and computer program products for transforming objects of one type to objects of another type through extension routines that alter the runtime operation of a serialization engine, without having to replace other existing routines within the serialization engine.

2. Background and Related Art

In a general sense, serialization is the conversion of single or graph of (nested) in-memory objects into a linear sequence of bytes suitable for transmission to a remote location, persistence on disk, etc. Conversely, deserialization takes the linear sequence of bytes and creates the corresponding single or graph of in-memory objects. Together, serialization and deserialization typically result in the creation of an exact clone of the original object.

Traditionally serialization code has been written as a monolithic implementation, with no provision for customization, short of replacing the entire implementation. A lack of customization or extensibility imposes an inflexible serialization mechanism on the marketplace, including developers and other interested parties. With a monolithic implementation, incremental improvements or customizations to address a particular problem directly often are not possible, and may require awkward workarounds or simply preclude certain desired operations. Should customization be undertaken in any event, standard routines implementing desirable operation typically are not accessible to the developer, and therefore need to be re-implemented, substantially (and often prohibitively) increasing the effort required to develop the desired customization. As a result, new features typically may be added to the serialization code only by the serialization code developers, precluding end users from developing their own enhancements or improving upon existing features.

Although an exact copy of an object often is the goal of serialization and deserialization, runtime transformations of object types, names, and data may be desirable in some circumstances. As indicated above, for example, serialization and deserialization may be used in transmitting an object to a remote location. The remote location may expect certain object types, object data, and object names that differ from the source object. Traditional serialization code may be written to perform object transformations, but the transformation cannot be added at runtime and is the same for all users, which ignores the likelihood that different users may have different needs. While a given transform may be extremely important for a particular user at a particular time, the overall relevance of the transform may be insignificant to the user base as a whole, and therefore never developed.

Traditional serialization code also tends to offer little flexibility in terms of identifying objects to transform, or basing transforms on data contained within an object. Accordingly, methods, systems, and computer program products for transforming objects from one type into objects of another type, based on customized routines for altering serialization and deserialization at runtime, without having to re-implement standard routines are desired.

BRIEF SUMMARY OF THE INVENTION

The present invention relates to methods, systems, and computer program products for converting an object of an initial type to an object of a final type, and allows for the runtime operation of the conversion process to be altered or customized. In accordance with example embodiments of the present invention which are described more fully below, an extensible serialization engine serializes, deserializes, and transforms objects of various types. The runtime operation of the serialization engine is altered by one or more extension routines that implement the desired customizations or extensions. These extension routines alter the runtime operation of the serialization engine, without requiring replacement of other existing routines.

In one example embodiment, type information is identified for an initial object received by the serialization engine for processing. Based on the type information, the initial object is converted to an intermediate representation which permits runtime modification, including modification of object names, object types, and object data. The intermediate representation of the initial object is modified in accordance with one or more extension routines which alter the runtime operation of the serialization engine, and the intermediate representation is converted to a final object of a final type.

The intermediate representation of the initial object may include an object name, an object type, and object data, each of which may be modified by the extension routines. The intermediate representation also may be modified by one or more standard routines within the serialization engine. Modification of the intermediate representation may be based on a particular pattern within the type information, object data within the initial object, metadata, or combinations of the foregoing.

Where the initial object is an in-memory object, the serialization engine serializes the initial object to generate the final object. The final object may be formatted in extensible Markup Language (XML) or in some other format suitable for representing a serialized object. Similarly, where the final object is an in-memory object, the serialization engine deserializes the initial object to generate the final object. The final object may be instantiated and populated as part of the deserialization process. In some circumstances, both the initial object and final object may be in-memory objects, or both may be serialized objects, such as when the serialization engine performs an object transform. To reduce buffer requirements, modification of the intermediate representation may be deferred until the intermediate representation is converted to the final object.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for converting objects of an initial type to objects of a final type that, and allows for the runtime operation of the conversion process to be altered or customized. The embodiments of the present invention may comprise one or more special purpose and/or one or more general purpose computers including various computer hardware, as discussed in greater detail below with respect to FIG. 6.

Figure 1:
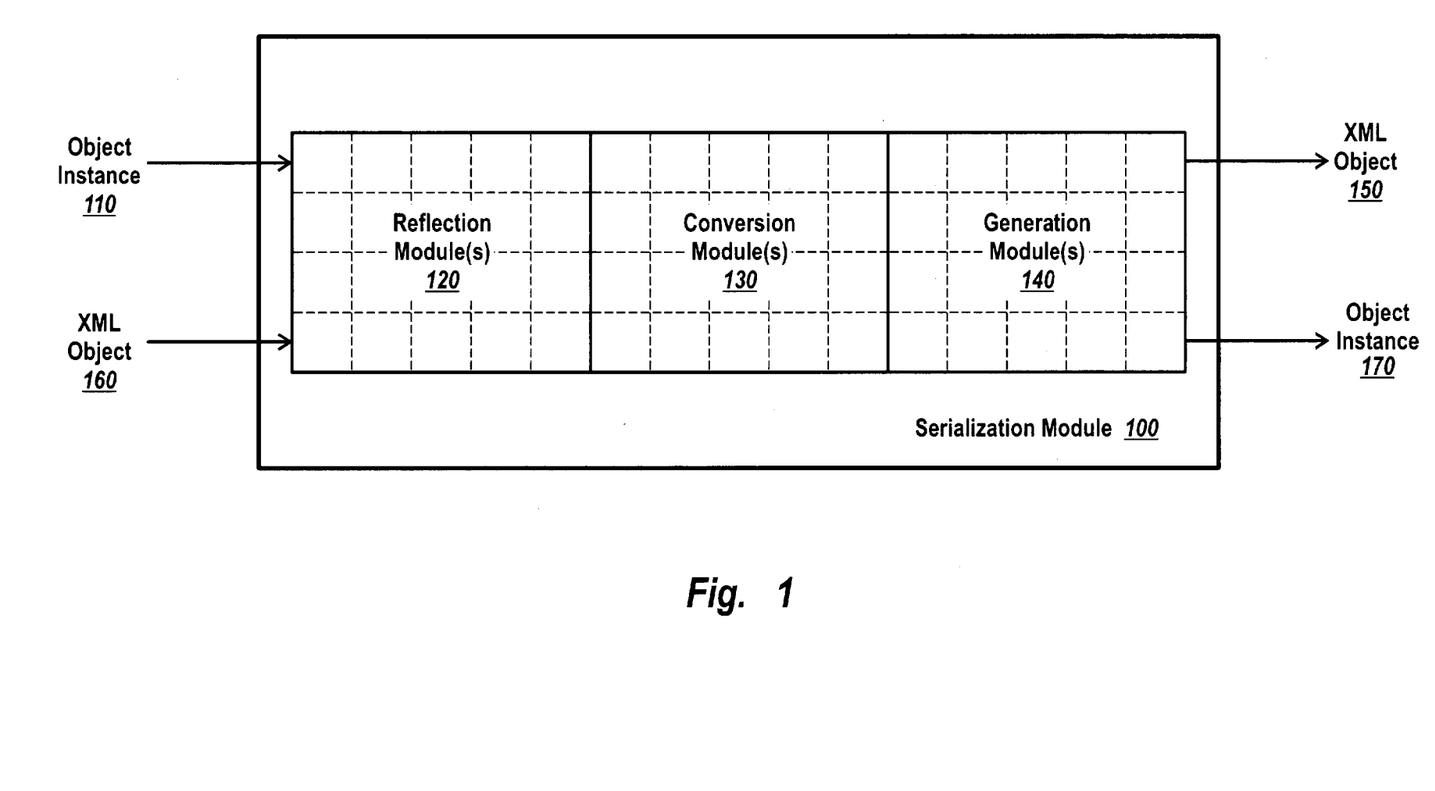
FIG. 1 illustrates an example serialization module and serialization infrastructure in accordance the present invention.

FIG. 1 illustrates an example serialization module and serialization infrastructure 100 (also known as a serialization engine) in accordance the present invention. For an object instance 110, serialization module 100 produces a corresponding serialized extensible Markup Language (XML) object 150. Similarly, for an XML object 160, serialization module 100 produces a corresponding deserialized object instance 170. It should be noted that throughout this application, serialization often is used as a generic term for serialization (e.g., converting a single or graph of in-memory objects into a linear sequence of bytes suitable for transmission to a remote location, persistence on disk, etc.), deserialization (from the linear sequence of bytes, creating the corresponding single or graph of in-memory objects), transformation (converting one object to another), etc. Such is the case here, for example, where serialization module 100 serializes, deserializes, and transforms objects of varying types.

Serialization module 100 includes one or more reflection modules 120, one or more conversion modules 130, and one or more generation modules 140. In this example embodiment, serialization module 100 converts a received in-memory object instance 110 to an XML object 150 suitable for transmission to a remote location, and converts a received XML object instance 160 to an in-memory object instance 170. Of course, in-memory and XML are merely examples of object types that may be created or received by serialization module 100. Each of the modules within serialization module 100 (reflection modules 120, conversion modules 130, and generation modules 140) may be replaced at runtime for customized serialization, deserialization, or transformation.

Reflection modules 120 are responsible for identifying type information for received object instance 110 and received XML object 160. The type information may comprise stored or received metadata that is associated with managed types within a manage code environment. Alternatively, the type information may be supplied to reflection modules 120 from various sources, including automated generation at compile time, manual generation, standard type information, etc.

Conversion modules 130 convert between objects of different types. Example conversion processes are described in more detail below, with respect to FIGS. 2–4. Conversion between different objects may be arbitrarily complex and include the generation of intermediate objects. Part of this complexity may include conversion based on data within an object and patterns of types associated with an object. For example, which conversions are performed may depend on certain object types or type names, the existence of a certain named or typed properties on a type, the existence of a property with certain meta data attached, object names associated with an object, etc. Conversion may be deferred until generation of the final object to reduce or avoid buffer requirements that otherwise may be part of converting one object to another.

Generation modules 140 are responsible for generating the final object produced by serialization module 100. In the case of XML object 150, generation module 140 creates the object-it generates the appropriate XML for the object—and may write the object to a stream. In the case of object instance 170, generation module 140 instantiates and populates the object.

Figure 2:
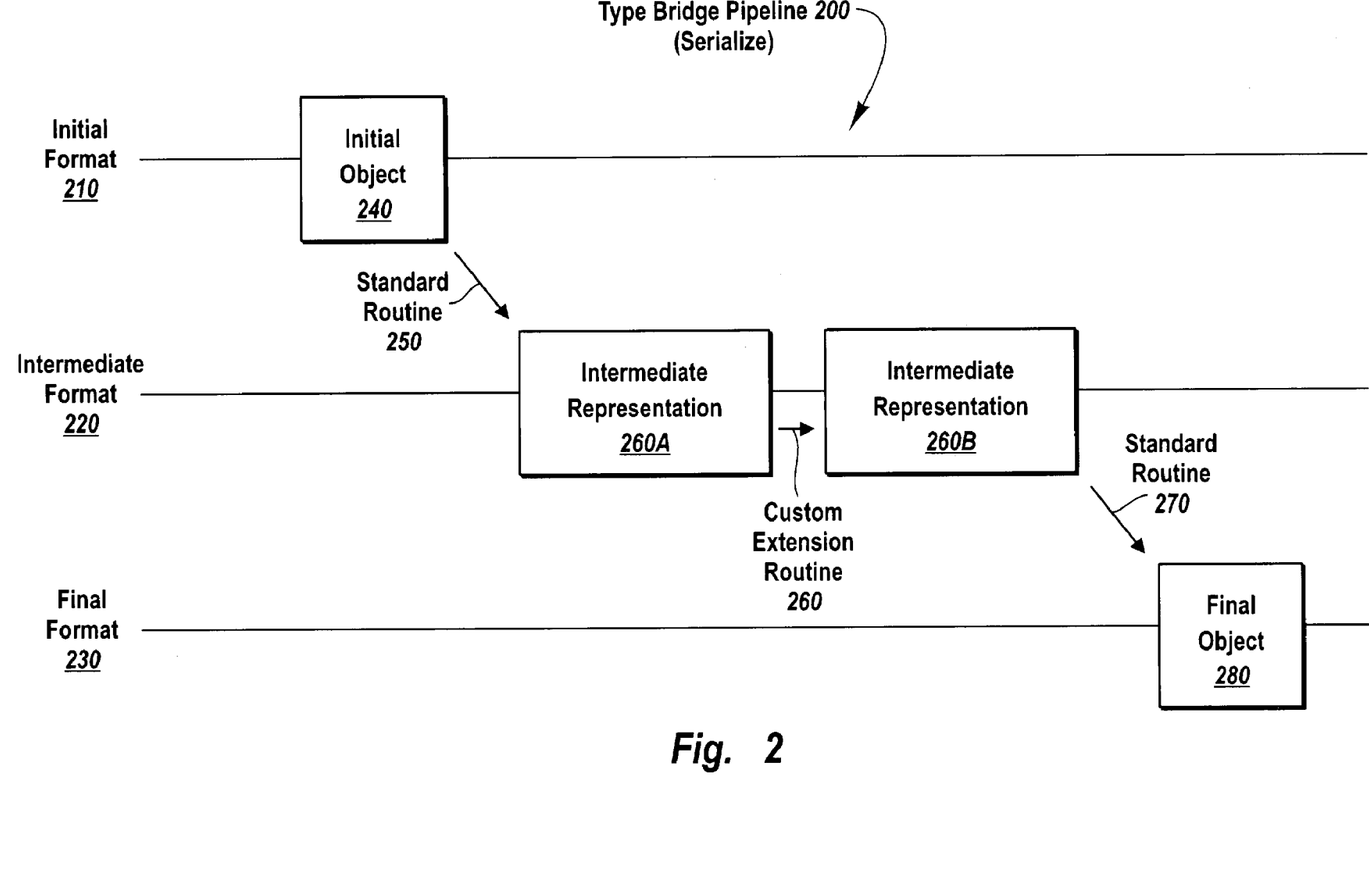
FIGS. 2–4 show object conversions in the context of example serialization, deserialization, and type transformation pipelines.
Figure 3:
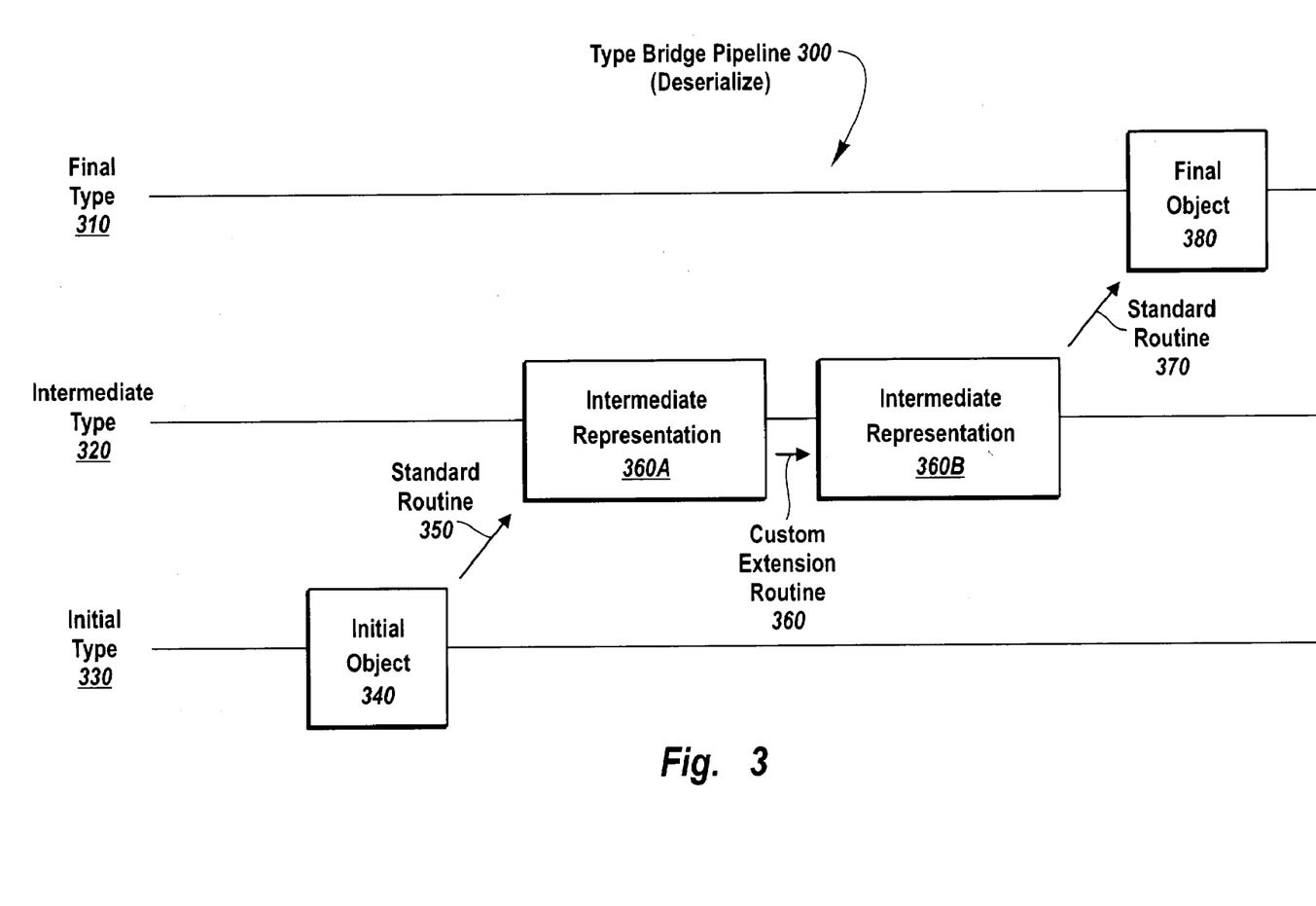
Figure 4:
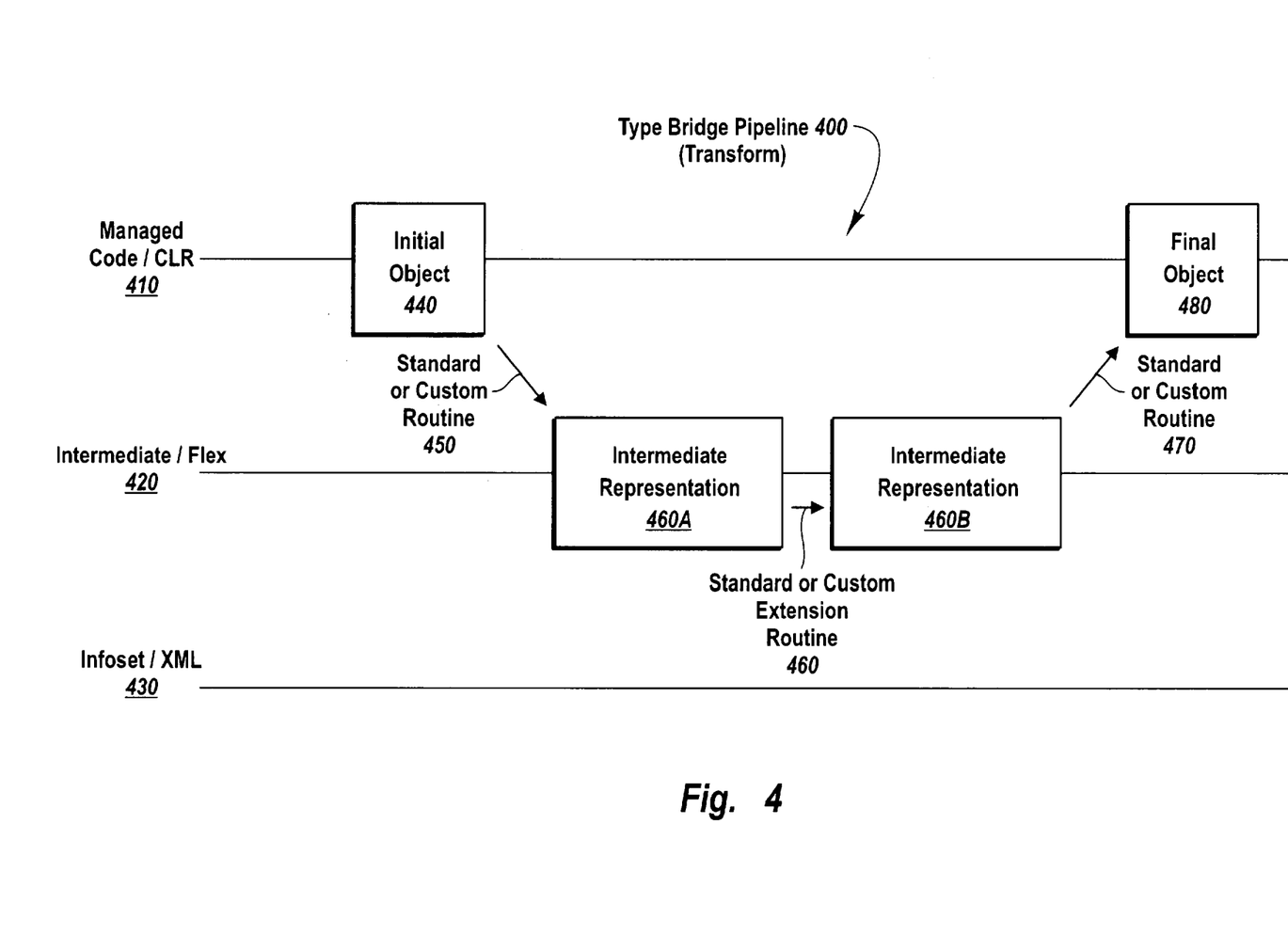

As indicated above, serialization module 100 is also known as a serialization engine. As shown in FIG. 1, the serialization engine is composed of several ordered sets of modules. Collectively, these modules are responsible for all operations. An individual module is known as a type bridge because, as described in greater detail below, modules convert from one type to another (or bridge between different types). A type bridge allows for type and instance transformation at runtime and/or to track information about an object being serialized, deserialized, or transformed. With reference to FIGS. 2–4, an ordered set of type bridges is known as a type bridge pipeline, and generally corresponds to an ordered set of conversion modules 130. For each of the operations performed by the serialization engine, a separate type bridge pipeline may exist. There is a pipeline for serialization (e.g., FIG. 2), deserialization (e.g., FIG. 3), transformation (e.g., FIG. 4), object copy, etc. Information generally applicable to all three drawing is presented below, prior to an individual discussion for each of FIGS. 2–4.

For the example pipelines shown in FIGS. 2–4, the code (one or more modules) that is responsible for serialization, deserialization, and transformation of objects is implemented as a number of predefined type bridges. These modules are placed in the appropriate pipeline and used at runtime. (The dashed squares in FIG. 1 are intended to represent available type bridge modules for use in various type bridge pipelines.) A large portion of the public application programming interface (API) for the example serialization engine shown in FIG. 1 is simply a wrapper over this predefined set of pipelines. This demonstrates how the serialization engine is extensible—the serialization engine is a simple set of abstract pipelines. The actual implementation of specific logic is found in pluggable modules that can be replaced at any time.

For the example type bridge pipelines illustrated in FIGS. 2–4, a given type bridge is capable of transforming one of three types of objects: an initial type object, an intermediate type object, and a final type object. In FIG. 4, the initial type object is a managed code object and the final type object is an XML object based on the World Wide Web Consortium (W3C) Infoset standard. The intermediate type object or intermediate representation shown in all three Figures is a construct found within the serialization engine and, as described in further detail below, represents an extensibility point. The intermediate representation is a mutable object based on a mutable type. As such, the mutable type serves to define behavior and typed data storage, with the mutable object serving to store typed data and act on the stored data through behavior defined on the type.

FIG. 2 shows an example type bridge 200 for serializing in-memory initial object 240 of initial type or format 210. (As used in the specification and claims, the term type should be interpreted broadly to encompass any object type or format.) Using standard routine 250, the initial object 240 is converted to intermediate representation 260A having an intermediate type or format 220. As will be described in greater detail below, this intermediate representation is mutable, allowing both object types and object data to be changed. Nevertheless, intermediate format 220 and initial format 210 also may be the same, closely related, somewhat different, completely different, etc.

Custom extension routine 260 converts intermediate representation 260A of initial object 240 to intermediate representation 260B. This conversion may include changing object types, object names, object data, and the like. Custom extension routine 260 represents a runtime extension of the serialization engine in general, and type bridge pipeline 200 in particular. Note that using custom extension routine 260 did not require re-implementing standard routine 250, as typically is the case with conventional serialization implementations.

Standard routine 270 converts the intermediate representation 260B to final object 280 of final type or format 230. Final object 280 is suitable for transmission to a remote location, persistence, etc. Accordingly, the final format 230 of final object 280 includes a wide range of object types. Here, as in other portions of the description, object type, format, and representation are a broad terms that encompass the overall type and format of the object, and type, format, names, and data that may be contained within an object.

FIG. 3 shows an example type bridge 300 for deserializing object 340 of initial type or format 330. Similar to FIG. 2, above, standard routine 350 converts initial object 340 to intermediate representation 360A with an intermediate type or format 320. Custom extension routine 360 converts intermediate representation 360A to intermediate representation 360B. Note that intermediate type 320 represents one or more intermediate types. Accordingly, intermediate representation 360A and intermediate representation 360B may be different types, but still appropriately designated as an intermediate type, particularly relative to initial type 330 and final type or format 310.

Standard routine 370 converts intermediate representation 360B to final 380 of final type 310. Because type bridge pipeline 300 is for deserializing, final object 380 is an in-memory object that is instantiated and populated. As will be described in more detail below, the type bridge pipeline 300 is connected to code for instantiating and populating object instances. This code may be referred to as an instance factory or writer, or write factory, and corresponds generally to generation modules 140 shown in FIG. 1.

FIG. 4 shows an example type bridge pipeline 400 for transforming an initial object 440 to a final object 480. The individual type bridges available in FIG. 4 are capable of transforming one of three different object types or formats: a managed code/CLR formatted objects 410, an intermediate/Flex formatted objects 420, and an Infoset/XML formatted objects 430. CLR stands for Common Language Runtime and is a part of Microsoft's .NET® managed execution environment. Among other things, the benefits of CLR include cross-language integration, cross-language exception handling, and the like. Language compilers emit metadata to describe types, members, and references. The metadata is stored with the code in the common language runtime portable execution file. Of course, CLR is merely one example of a managed code type. As suggested in FIG. 4, both objects may be in-memory objects (e.g., CLR formatted objects), or, alternatively, both objects may be serialized objects, (e.g., Infoset formatted objects). In other words, both the initial and final object may be of the same type.

CLR objects 410 are instances of CLR types that contain a combination of data and behavior, although only the data is relevant for serialization purposes. As indicated above, an Infoset object or representation 430 is formatted according to a W3C standard for a tree structure composed of a predefined set of data nodes with certain semantics. A flex object 420 is a construct found within the serialization engine and represents an extensibility point for the serializer.

A flex object is a mutable object that is based on a mutable type. The mutable type is known as a flex type. In the example type bridge pipeline 400 shown in FIG. 4, a flex type serves the same function as its corresponding CLR type: defining behavior and type data storage. Similarly, a flex object serves the same function as a CLR object: storing typed data and acting on this data through behavior defined on the type. The reason for using flex type and flex object is that CLR types are immutable.

For the example type bridge pipeline shown in FIG. 4, certain constraints are placed on the types that can be serialized to foster simplicity and extensibility. These constraints reduce the number of different patterns and permutations that the serializer needs to recognize in order to serialize and deserialize a given type. To this end, the serialization engine only understands how to serialize CLR objects whose types follow what is known as the core model. Types that conform to the core model must either expose their data as properties (or fields) or implement a particular interface (which defines explicit read and write methods). In addition, these types need to provide a public default constructor. Types that do not follow the core model cannot be serialized.

Flex types and flex objects are used to change the shape (members, interfaces, etc.) of a given CLR object to conform to the core model. For the given CLR object, a flex type can be constructed that exposes a different set of member and type information than the instance's CLR type. A flex object based on the flex type can be instantiated that delegates certain invocations to the CLR object itself. The flex object also can perform optional transformations of the data within the CLR object, either prior to or following delegation. As a result, data within the CLR object may be exposed in various ways, including one that conforms to the core model. Accordingly, a type bridge may start with an object type that does not conform to the core model and produce an object type that does.

A type bridge may transform CLR objects, flex objects, and Infoset representations in a variety of ways. Any given type bridge has an input type which it acts upon and an output type which it produces or generates. This output is passed to the next type bridge in the pipeline. For the example type bridge pipeline 400, the following transforms are permitted:

| Input Type | Output Type | Description |
|---|---|---|
| CLR | CLR | Transforms a CLR object into a new CLR object |
| CLR | Flex | Transforms a CLR object into a flex object |
| CLR | Infoset | Transforms a CLR object into an Infoset object |
| Flex | Flex | Transforms a flex object into a new flex object |
| Flex | CLR | Transforms a flex object into a CLR object |
| Flex | Infoset | Transforms a flex object into an Infoset object |
| Infoset | Infoset | Transforms an Infoset object into a new Infoset object |
| Infoset | Flex | Transforms an Infoset object into a flex object |
| Infoset | CLR | Transforms an Infoset object into a CLR object |

The different classifications of type bridges are composed to provide the base operation of the serialization engine. (Although FIGS. 2 and 3 reference generic types, reference to these Figures is made below with the specific types illustrated in FIG. 4 to provide further context.)

1. Serialization transforms a CLR object into an Infoset object or representation. In order to perform this operation, a type bridge pipeline exists (such as the one shown in FIG. 2) that includes a CLR to flex type bridge (e.g., standard routine 250), any number of flex to flex bridges, and a flex to Infoset type bridge (e.g., standard routine 270).
2. Deserialization transforms an Infoset representation into a CLR object. In order to perform this operation, a type bridge pipeline exists (such as the one shown in FIG. 3) that includes an Infoset to flex type bridge (e.g., standard routine 350), any number of flex to flex bridges, and a flex to CLR type bridge (e.g., standard routine 370).
3. Object Copy is used to create a deep copy of a CLR object. In order to perform this operation, a type bridge pipeline exists that includes a CLR to CLR type bridge.
4. Object Transformation (FIG. 4) creates a deep copy (final object 480) of the CLR object or objects (initial object 440) while performing optional transformations (standard or custom extension routine 460) on the instance data (intermediate representations 460A and 460B). In order to perform this operation, a type bridge pipeline exists that includes a CLR to flex type bridge (standard or custom routine 450), one or more optional flex to flex type bridges (standard or custom extension routine 460) that performs the transformations, and a flex to CLR type bridge (standard or custom routine 470).
5. Infoset Transformation creates a copy of and optionally transforms an Infoset object. Similar to object copy, in order to perform this operation, a type bridge pipeline exists that includes an Infoset to Infoset type bridge.

The last three options are noteworthy due to the manner in which they are implemented. Whereas other implementations buffer object or Infoset data, embodiments of the present invention may defer transformations to avoid or reduce buffering requirements. As a result, performance and resource management may be improved significantly.

In order to support the above operations, the serialization engine provides stock or base type bridges that perform the appropriate transformations. In FIG. 4, any of the standard or custom routines 450, 460, and 470 may be stock type bridges or custom replacements. Using an extensible configuration mechanism, the appropriate type bridges are identified and loaded into pipelines at runtime. The serialization engine uses these stock pipelines to perform the requested operation. The stock type bridges, however, may be replaced at any time, as the engine uses a notion of abstract type bridges, rather than specific stock implementations. In one example embodiment, a pipeline simply comprises a list of type bridges for the pipeline—changing the list changes the pipeline. For this example embodiment, once a particular type bridge is called for an object, no other type bridges are called for that object.

Note that in an example embodiment, CLR 410, flex 420, and Infoset 430 correspond to initial format 210, intermediate format 220, and final format 230 for serialization as shown in FIG. 2, and correspond to final type 310, intermediate type 320, and initial type 330 for deserialization as shown in FIG. 3. Flex object is the intermediate format between both CLR and Infoset. In this example embodiment, a type bridge is not permitted to transform directly from CLR to Infoset or vice versa. Among other things, this helps to simplify the example serialization engine. While the base functionality or operation of the serialization engine is defined by stock type bridges, there are many additional features (such as support for legacy programming models) that developers may expect as well. The stock type bridges could have been designed to implement these features, but instead, there are several stock flex to flex type bridges that serve this purpose. This approach ensures that stock type bridges are simple and extensible. As a result, various developers can make modifications to standard features and provide new features of their own.

For this example embodiment, consider a serialization process for a CLR type named Person with two properties, FirstName and LastName. In order to serialize (see FIG. 2) an instance of this type, a pipeline with stock CLR to flex and flex to Infoset type bridges is needed. The serialization engine passes the Person instance to the CLR to flex type bridge. This type bridge returns a new flex object instance based on and delegating to the Person instance. The flex object is then passed to the flex to Infoset type bridge.

The flex to Infoset type bridge is responsible for transforming or converting the flex object into an Infoset representation. Prior to the conversion, the stock flex to Infoset type bridge determines the manner in which to map the structure of the flex object to Infoset. The stock implementation in this example uses a schema language and defines mappings with the constructs defined in the language. Since type bridges are replaceable, a new mapping mechanism, including support for a new schema language, could be introduced, which represents another extensibility point within the serialization engine. Once the mapping process is complete, the flex object is transformed into an Infoset representation which is written to a stream.

As briefly mentioned above, the type bridges within the serialization engine are connected to writer factories. Writer factories are responsible for creation of a resource that is capable of writing data. Although the resource could write data to any target, the most common destinations are data streams (following serialization for transport) and CLR objects (following deserialization). The stock writer factory for this example embodiment returns a resource that writes to a user-supplied data stream. The resource produced by this factory can write to the stream in any format it desires. As such, it is not pinned to the XML serialization format, which make the writer factory replaceable and introduces yet another extensibility point within the serialization engine.

Deserialization (see, for example, FIG. 3) of the Infoset representation in this example embodiment involves a pipeline that includes the stock Infoset to flex and flex to CLR type bridges. The serialization engine passes a user-provided stream representing the source Infoset as well as the CLR type (Person) that is being deserialized to the first type bridge (Infoset to flex). This type bridge creates a new flex object instance based on the Person type that delegates to the stream. The resulting flex object is passed to the flex to CLR type bridge which populates an instance of Person with data from the flex object (the flex object is actually in the stream since the flex object is delegating). As with serialization, the deserialization pipeline terminates in a writer factory. The stock write factory for the deserialization pipeline is responsible for creating the instance of the CLR type being deserialized.

In addition to serialization and deserialization, it may be desirable to transform the Person type. As indicated above, the shape of the Person type includes two properties: FirstName and LastName. Suppose, for example, that one application using this definition of Person interacts with another application using a different Person definition (e.g., a Person with one property—FullName). While one option would be to have both applications use the same Person type, this might not always be possible (both application may have already been written).

In accordance with the example embodiment being described, a type bridge may be created that transforms the shape of a Person instance in one application to the shape expected in the other. To make the transformation (see FIG. 2), a new flex to flex type bridge (e.g., custom extension routine 260) needs to be constructed and placed in the serialization pipeline after the stock CLR to flex type bridge (e.g., standard routine 250). During the serialization process, this type bridge is passed a flex object that delegates to the Person instance. The type bridge constructs a new flex type with the different shape (single FullName property). Based on this flex type, a new flex object is created that concatenates the FirstName and LastName properties found on the original flex object (which also delegates to the Person instance). This flex object is passed to the stock flex to Infoset type bridge (e.g., standard routine 270) which serializes one property rather than two. It is worth noting that the concatenation may not actually be performed until the flex to Infoset type bridge requests the value of the new FullName property. Accordingly, the transformation is deferred until the creation of the Infoset or final object.

Accordingly, a serialization engine in accordance with the present invention may offer an extensible architecture for transforming between systems and types, including: support for pluggable type and data transformations; support for mutable types and objects; support for pluggable schema type systems; support for pluggable data formats, etc.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 5A:
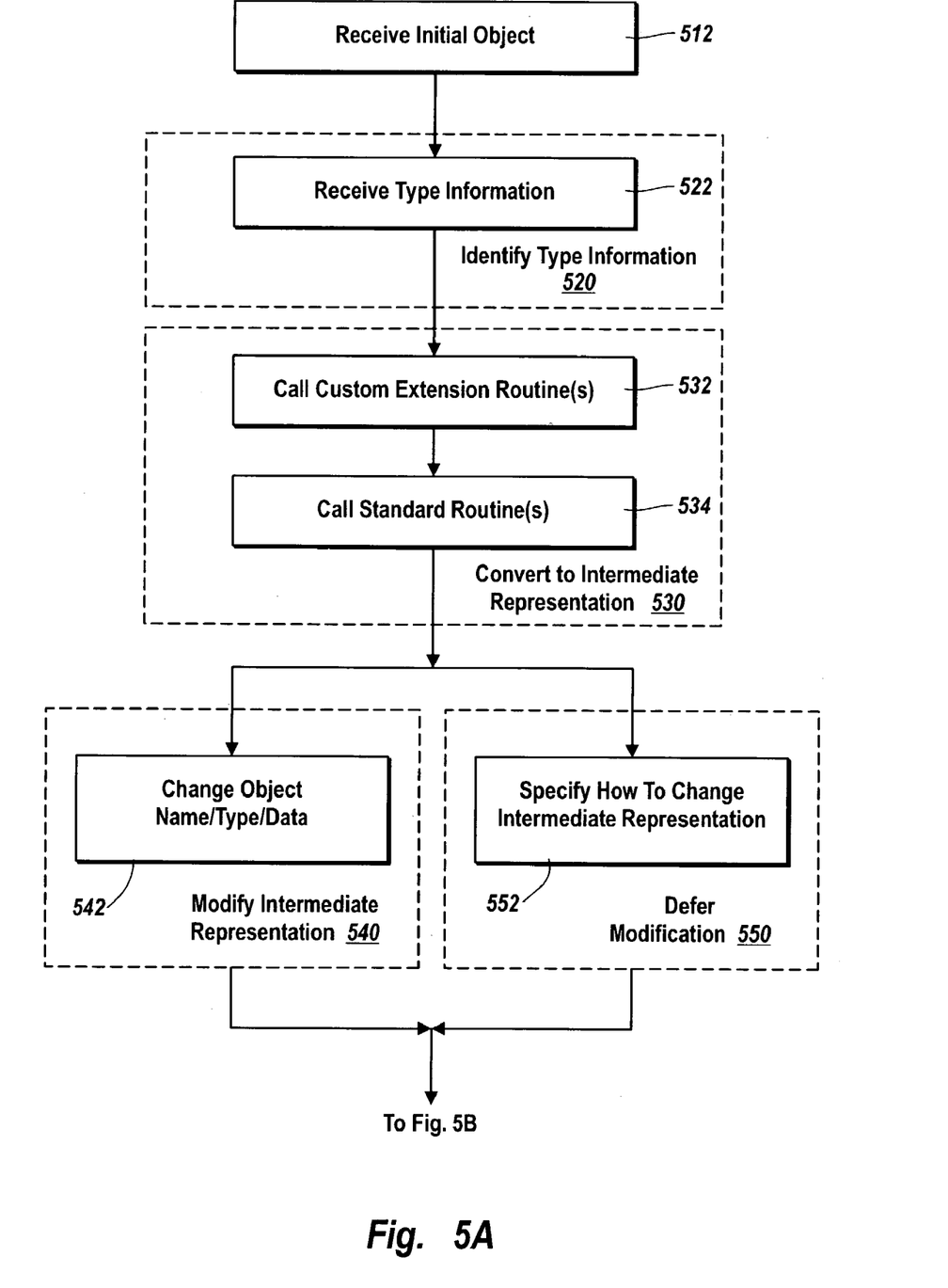
FIGS. 5A–5B show example acts and steps for methods of serializing, deserializing, and transforming objects in accordance with the present invention.
Figure 5B:
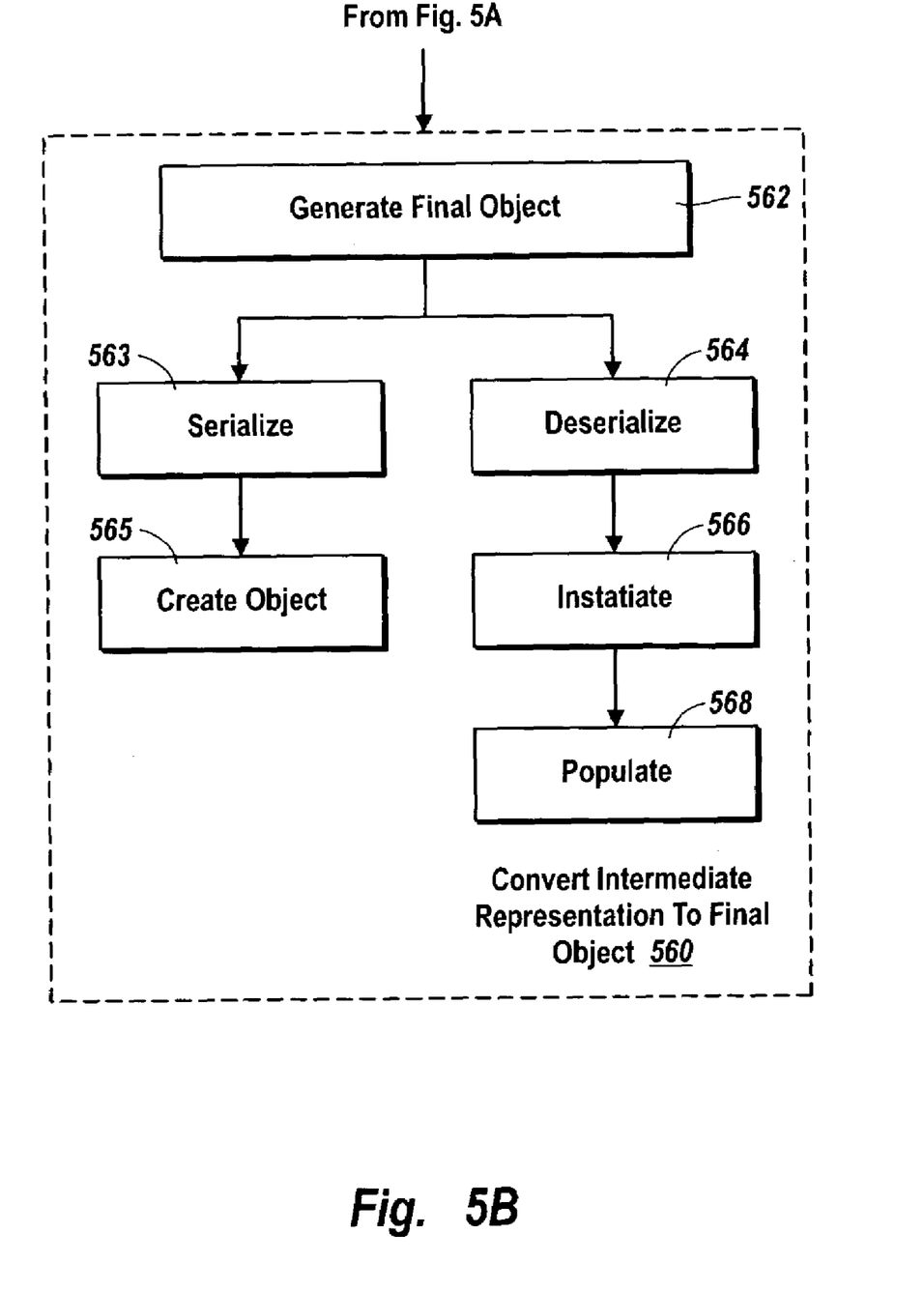

FIGS. 5A–5B show example acts and steps for methods of serializing and deserializing objects in accordance with the present invention, which may include an act of receiving (512) an initial object of an initial type for runtime processing by a serialization engine. A step for identifying (520) type information for the initial object may include an act of receiving (522) the type information. The type information may be supplied as metadata associated with managed code.

A step for converting (530) the initial object to an intermediate representation based on the initial type information may include acts of generating (not shown) the intermediate representation based on the type information, and calling (532) one or more custom extension routines and calling (534) one or more standard routines to modify the intermediate representation. The one or more extension routines alter the runtime operation of the serialization engine.

It should be noted that the intermediate representation may comprise an object name, an object type, and/or object data. Although not shown, a step for modifying (540) the intermediate representation also may include acts of calling (not shown) one or more custom extension routines and calling (not shown) one or more standard routines to modify the intermediate representation. A step for modifying (540) the intermediate representation may further include an act of changing (540) an object's name, type, and/or data. A step for deferring (550) modification may include an act of specifying (552) how to modify the intermediate representation, without actually modifying the intermediate representation. Deferring may help to reduce buffer and processing requirements otherwise associated with modifying the intermediate representation in place.

A step for converting (560) the intermediate representation of the initial object to a final object of a final type or format may include the following acts. When serializing (563), the step may include an act of creating or generating (565) the final object. In one example embodiment as described above the final object is formatted in XML for transport. Creating or generating (565) the final object, therefore, may include generating the appropriate XML and writing the final object to a stream. Alternatively, the final object may be formatted for persistence to disk or in any other format suitable for representing the serialized initial object. When deserializing (564), the step may include acts of instantiating (566) and populating (568) the final object. During the step for converting (560), custom extension and standard routines are invoked for any deferred modifications that indicated how a change should be made, but did not actually make the change.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
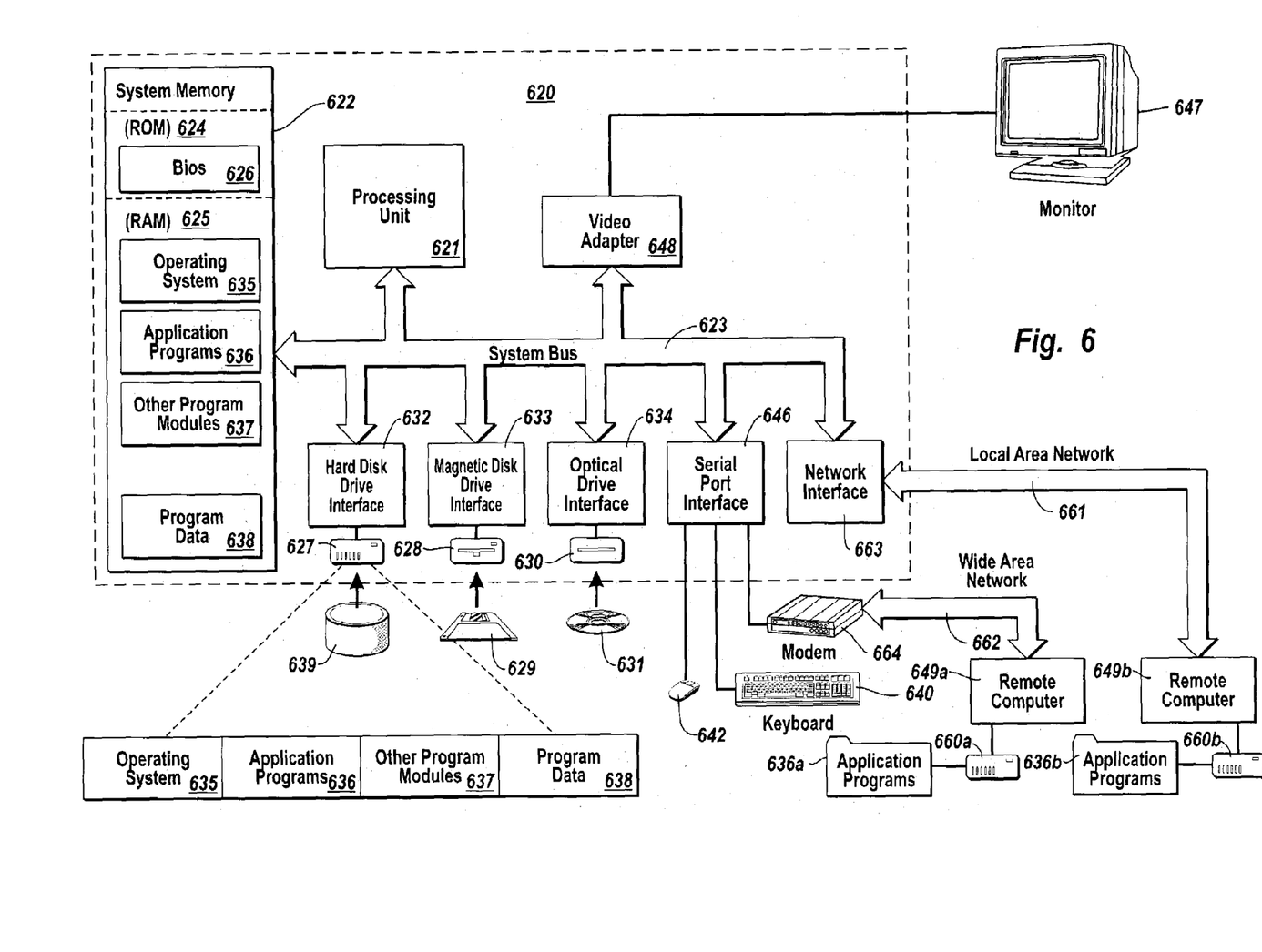
FIG. 6 illustrates an exemplary system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or comemory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 847 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649*a* and 649*b*. Remote computers 649*a* and 649*b* may each be another personal computer, a server, a router, a network PC, a peer device or other common network node, and typically include many or all of the elements described above relative to the computer 620, although only memory storage devices 650*a* and 650*b* and their associated application programs 636*a* and 636*b* have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system comprising an extensible serialization engine that is capable of serializing and deserializing data objects of various types, a method of transforming an initial object of an initial type to a final object of a final type, wherein the method allows for runtime operation of the serialization engine to be altered by one or more extension routines, without having to replace a monolithic implementation of the serialization engine, the method comprising acts of:

receiving an initial object of an initial type for runtime processing by the serialization engine;

receiving type information for the initial type of the initial object;

based on the type information, generating an intermediate representation of the initial object that is suitable for runtime modification;

calling one or more custom extension routines to change the intermediate representation of the initial object to a modified intermediate representation of the initial object, thereby altering the runtime operation of the serialization engine;

from the modified intermediate representation of the initial object, generating a final object of a final type, wherein at least one of the final object and the initial object is an in-memory object, and where the final object comprises an in-memory object to be instantiated and populated based on the initial object, the serialization engine deserializes the initial object to generate the final object, and where the initial object comprises an in-memory object, the serialization engine serializes the initial object to generate the final object; and wherein the one or more custom extension routines called to change the intermediate representation specify how to change the intermediate representation, without actually changing the intermediate representation, such that changing the intermediate representation is deferred until generating the final object, in order to reduce buffering requirements.

2. A method as recited in claim 1, wherein the intermediate representation comprises an overall type for the initial object and, for one or more objects contained within the initial object, an object name, an object type, and object data.

3. A method as recited in claim 2, further comprising an act of changing at least one of the overall object type, and, for the one or more objects contained within the initial object, the object name, the object type, and the object data.

4. A method as recited in claim 1, further comprising an act of calling one or more standard routines to modify the intermediate representation of the initial object.

5. A method as recited in claim 1, wherein modification of the intermediate representation of the initial object is based on a particular pattern within the type information.

6. A method as recited in claim 1, wherein modification of the intermediate representation of the initial object is based on object data within the initial object.

7. A method as recited in claim 1, wherein the serialization engine is part of a messaging system for a distributed application that sends and receives one or more messages, and wherein the initial object and the final object represent at least a portion of a message.

8. For a computing system comprising an extensible serialization engine that is capable of serializing and deserializing data objects of various types, a computer program product comprising one or more tangible computer readable storage media having stored thereon computer executable instructions that implement a method of transforming an initial object of an initial type to a final object of a final type, wherein the method allows for runtime operation of the serialization engine to be altered by one or more extension routines, without having to replace a monolithic implementation of the serialization engine, the method comprising acts of:

receiving an initial object of an initial type for runtime processing by the serialization engine;

receiving type information for the initial type of the initial object;

based on the type information, generating an intermediate representation of the initial object that is suitable for runtime modification;

calling one or more custom extension routines to change the intermediate representation of the initial object to a modified intermediate representation of the initial object thereby altering the runtime operation of the serialization engine;

from the modified intermediate representation of the initial object, generating a final object of a final type, wherein at least one of the final object and the initial object is an in-memory object, and where the final object comprises an in-memory object to be instantiated and populated based on the initial object, the serialization engine deserializes the initial object to generate the final object, and where the initial object comprises an in-memory object, the serialization engine serializes the initial object to generate the final object; and wherein the one or more custom extension routines called to change the intermediate representation specify how to change the intermediate representation, without actually changing the intermediate representation, such that changing the intermediate representation is deferred until generating the final object, in order to reduce buffering requirements.

9. A computer program product as recited in claim 8, wherein the intermediate representation comprises an overall type for the initial object and, for one or more objects contained within the initial object, an object name, an object type, and object data.

10. A computer program product as recited in claim 9, the method further comprising an act of changing at least one of the overall object type, and, for the one or more objects contained within the initial object, the object name, the object type, and the object data.

11. A computer program product as recited in claim 8, the method further comprising an act of calling one or more replaceable standard routines to modify the intermediate representation of the initial object.

12. A computer program product as recited in claim 8, wherein modification of the intermediate representation of the initial object is based on at least one of a particular pattern within the type information, metadata, and object data within the initial object.

13. A computer program product as recited in claim 8, wherein both the initial object and the final object are in-memory objects.

14. In a computing system comprising an extensible serialization engine that serializes and deserializes data objects of various types, a method of converting an initial object of an initial type to a final object of a final type, wherein the method allows for operation of the serialization engine to be altered at runtime by one or more extension routines, without having to replace one or more other existing routines of the serialization engine, the method comprising steps for:

identifying type information for an initial object of an initial type received for runtime processing by the serialization engine;

based on the type information, converting the initial object to an intermediate representation of the initial object that is suitable for runtime modification;

modifying the intermediate representation of the initial object in accordance with one or more extension routines to generate a modified intermediate representation of the initial object, thereby altering the runtime operation of the serialization engine;

converting the modified intermediate representation of the initial object to a final object of a final type, wherein at least one of the final object and the initial object is an in-memory object, and where the final object comprises an in-memory object to be instantiated and populated based on the initial object, the serialization engine deserializes the initial object to generate the final object, and where the initial object comprises an in-memory object, the serialization engine serializes the initial object to generate the final object; and deferring modification of the intermediate representation until the intermediate representation is converted to the final object in order to avoid buffering modification of the intermediate representation.

15. A method as recited in claim 14, wherein the intermediate representation of the initial object comprises at least one of an object name, an object type, and object data.

16. A method as recited in claim 15, wherein the step for modifying the intermediate representation of the initial object in accordance with one or more extension routines, comprises modifying at least one of the object name, the object type, and the object data.

17. A method as recited in claim 14, further comprising a step for modifying the intermediate representation of the initial object in accordance with one or more standard routines within the serialization engine.

18. A method as recited in claim 14, wherein modification of the intermediate representation of the initial object is based on either a particular pattern within the type information, object data within the initial object, or both.

19. A method as recited in claim 14, wherein both the initial object and the final object are in-memory objects.

20. For a computing system comprising an extensible serialization engine that serializes and deserializes data objects of various types, a computer program product comprising one or more tangible computer readable storage media having stored thereon computer executable instructions that implement a method of converting an initial object of an initial type to a final object of a final type, wherein the method allows for operation of the serialization engine to be altered at runtime by one or more extension routines, without having to replace one or more other existing routines of the serialization engine, the method comprising steps for:

identifying type information for an initial object of an initial type received for runtime processing by the serialization engine;

based on the type information, converting the initial object to an intermediate representation of the initial object that is suitable for runtime modification;

modifying the intermediate representation of the initial object in accordance with one or more extension routines to generate a modified intermediate representation of the initial object, thereby altering the runtime operation of the serialization engine;

converting the modified intermediate representation of the initial object to a final object of a final type, wherein at least one of the final object and the initial object is an in-memory object, and where the final object comprises an in-memory object to be instantiated and populated based on the initial object, the serialization engine deserializes the initial object to generate the final object, and where the initial object comprises an in-memory object, the serialization engine serializes the initial object to generate the final object; and deferring modification of the intermediate representation until converting the intermediate representation to the final object.

21. A computer program product as recited in claim 20, wherein the intermediate representation of the initial object comprises at least one of an object name, an object type, and object data.

22. A computer program product as recited in claim 20, wherein the step for modifying the intermediate representation of the initial object in accordance with one or more extension routines, comprises modifying at least one of the object name, the object type, and the object data.

23. A computer program product as recited in claim 20, the method further comprising a step for modifying the intermediate representation of the initial object in accordance with one or more standard routines.

24. A computer program product as recited in claim 20, wherein modification of the intermediate representation of the initial object is based on either a particular pattern within the type information, object data within the initial object, or both.

25. A computer program product as recited in claim 20, wherein both the initial object and the final object are in-memory objects.

26. A computer program product implementing an extensible serialization engine for transforming one or more initial objects of one or more initial types to one or more final objects of one or more final types, wherein runtime operation of the serialization engine to be altered, without having to re-implement existing portions of the serialization engine, the computer program product comprising one or more tangible computer readable storage media having stored thereon computer executable instructions in the form of program modules, the program modules comprising:

a runtime replaceable reflection module for identifying type information for an initial object of an initial type received for runtime processing by the serialization engine;

one or more runtime replaceable conversion modules for generating and modifying an intermediate representation of the initial object based on the identified type information, wherein the one or more runtime replaceable conversion modules comprise one or more extension routines that alter the runtime operation of the serialization engine; and a runtime replaceable generation module for creating a final object of a final type from a modified intermediate representation generated by the one or more conversion modules, wherein at least one of the final object and the initial object is an in-memory object, and where the final object comprises an in-memory object to be instantiated and populated based on the initial object, the serialization engine deserializes the initial object to generate the final object, and where the initial object comprises an in-memory object, the serialization engine serializes the initial object to generate the final object; and wherein the one or more runtime replaceable conversion modules are capable of deferring one or more modifications to the intermediate representation of the initial object until the intermediate representation is converted to the final object so as to avoid buffer requirements associated with making the one or more modifications to the intermediate representation.

27. A computer program product as recited in claim 26, wherein the intermediate representation comprises an object name, an object type, and object data for the initial object and any objects contained within the initial object.

28. A computer program product as recited in claim 26, wherein the one or more runtime replaceable conversion modules are capable of changing at least one of an object name, an object type, and object data for the initial object and any objects contained within the initial object.

29. A computer program product as recited in claim 28, wherein the one or more runtime replaceable conversion modules are capable of tracking information about the initial object, without modifying the intermediate representation.

30. A computer program product as recited in claim 26, wherein the one or more runtime replaceable conversion modules comprise one or more standard routines to modify the intermediate representation.

31. A computer program product as recited in claim 26, wherein the one or more runtime replaceable conversion modules are capable of modifying the intermediate representation of the initial object based on either a particular pattern within the type information, object data within the initial object, or both.

32. A computer program product as recited in claim 26, wherein the runtime replaceable generation module is capable of creating the final object in extensible Markup Language (XML) format.

33. A computer program product as recited in claim 26, wherein the runtime replaceable generation module is capable of instantiating and populating the final object based on the intermediate representation.

* * * * *